United States Patent [19]
Burns et al.

[11] Patent Number: 5,748,241
[45] Date of Patent: May 5, 1998

[54] RESIDUAL CODING OF MODEL FAILURE REGIONS IN COMPRESSED VIDEO SEQUENCES

[75] Inventors: Ronnie R. Burns, Irvine; Ram Nagarajan, Los Angeles, both of Calif.

[73] Assignee: HE Holdings, Inc.

[21] Appl. No.: 768,165

[22] Filed: Dec. 13, 1996

[51] Int. Cl.$^6$ ..................................................... H04N 7/24
[52] U.S. Cl. ............................................. 348/390; 382/232
[58] Field of Search .................................. 348/390, 384, 348/409, 415; 382/232, 235, 236, 238; H04N 7/13, 7/137

[56] References Cited

U.S. PATENT DOCUMENTS

| | | | |
|---|---|---|---|
| 5,646,867 | 7/1997 | Ozcelik et al. | 348/413 |
| 5,654,771 | 8/1997 | Tekalp et al. | 348/699 |

*Primary Examiner*—Bryan S. Tung
*Attorney, Agent, or Firm*—Terje Gudmestad; Elizabeth E. Leitereg; Wanda K. Denson-Low

[57] ABSTRACT

A method for residual coding of model failure regions in compressed video sequences in which a database of residuals for previous model failures is maintained at both the encoder and the decoder. The residuals for each determined model failure regions are compared with the residuals for previous model failures for the same region. In the event a current residual is identified in the database, only the index to the residual in the database needs to be sent. An additional residual taken after the model failure region has been partially corrected with a current residual identified in the database may also be transmitted. This mode provides increased quality at reduced bit rates by maximizing the utilization of previously transmitted or stored data. The process continuously updates the database at both the encoder and decoder when the current residual is not found. The process uses residuals of residuals to provide increased quality of reduced bit rates.

10 Claims, 3 Drawing Sheets

RESIDUAL CODING OF MODEL FAILURE REGIONS IN COMPRESSED VIDEO SEQUENCES

TECHNICAL FIELD

The present invention is related to the compression and decompression of digital video data and, in particular, to a method for coding model failure regions in compressed video sequences.

BACKGROUND ART

Video compression systems are employed to reduce the quantity of digital video data that needs to be stored or transmitted which permits an appropriate reconstruction of the video image at a later point in time or at a different location. As a result of the compression, a lower bandwidth communication channel can be used to transmit the data from one place to the other in comparison to the transmission of uncompressed video data. In a like manner, the compression of the video data also reduces the memory capacity required to store the image data.

A data compression method using encoded model failures of the type taught by the prior art is shown in FIG. 1. The process begins with the generation of original video data, shown at block 10. A video object of the original image is then encoded to generate encoded object data, as indicated by block 12, using any technique known in the art. The video object may be either a complete picture or an identified part of a picture such as a head of a person or any other object of particular interest within the picture. The encoded data is then decoded using the inverse of the encoding technique used to encode the data to generate decoded or model video data as indicated by block 14. The model video data is compared with the original video data to generate difference data, block 16, which is the difference between the original video data and the model video data. The process then proceeds to identify or determine model failure regions, "i", block 18, where the difference between the original video data and the model video data exceeds a predetermined threshold.

The prior art method then calculates residual data for each model failure region i, as indicated in block 20. The residual data includes identification of the boundaries of the failed region, quantizing the difference and formatting this information. The residual data is then encoded, block 22, for formatting into the data bitstream. The encoding process then inquires decision block 24, if there are any other model failure regions to be encoded. If so, the encoding process will return to block 20 and the residual for the next model failure region is calculated and encoded, blocks 20 and 22, respectively, until the residual for all model failure regions are calculated and encoded. After the calculation of the residual and encoding of the residual data for all the model failure regions is complete, i.e., the answer to decision block 24 is negative, the encoding process will generate an "end of object" code and will multiplex the encoded video data, the encoded residuals and the "end of object code" to form a bitstream of compressed data.

In the approach taken by the prior art, the difference data between the original and decoded data is transmitted to enhance the quality of the reconstructed image. The use of residual errors is very important to constructing a sequence of image frames from a single starting frame. Warping of the object takes care of global changes as the object undergoes movement from frame to frame. For example, a talking head undergoes small distortions due to small head and shoulder movements. However, unless a new sequence is started, changes such as eye or mouth opening and closing are not captured by the warping coding or may be poorly captured by the morphing (interpolation) coding, or may be poorly modeled by another object coding method. Hence, an efficient method of transmitting residual error data are required to correct for the model deficiencies. Since, for example, a talking head will demonstrate similar changes over and over again, a catalog of error corrections can be constructed at the decoder for reuse rather than having to retransmit the data each time a change occurs.

DISCLOSURE OF THE INVENTION

The invention is a method for residual coding of model failure regions of compressed video sequences in which residuals of previous model failures are stored in a database. The process involves the compression and encoding of original video data, then decoding the encoded original video data to generate model video data. The original and model video data are compared to detect failure of the model video data to replicate the original video data. Residuals indicative of differences between the original and model video data are calculated for each region of model failure to generate current residuals which are compared with the residuals stored in the database. The process selects the best from among the current residual, the previous residual, or the residual of a previous residual as the model failure correction mode. The model failure correction mode is then encoded identifying the region of model failure, the selected model failure correction mode and the correction data. The coded data is then appended to the encoded original video data for transmission or storage.

The decoder will also include an identical previous model failure database from which the residual can be extracted when identified in the encoded bitstream of the compressed video data. The residuals stored in the database of previous model failures is updated when the current residual is identified in the bitstream of video data.

One object of the invention is that it provides a very efficient encoding of the residual error that results from failures to model certain regions correctly.

Another object of the invention is that it is ideally suited for objects which remain substantially the same during the sequence of interest and undergoes only small changes.

Another object of the invention is that a copy of the database of residuals is incorporated into the decoder.

Still another object of the invention is that many residuals may be identified by sending only an index to the database.

Another object of the invention is that the model failure region may be improved first with the best among the previously transmitted residuals stored in the database and then with a residual between this improved model failure region-and the same region of the original video data.

Yet another object of the invention is that the procedure may be iterated so that the nth frame is corrected by data from more than one previous frame.

These and other objects will become more apparent from a reading of the specification in conjunction with the drawings.

BEST MODE FOR CARRYING OUT THE INVENTION

The current approach to image data correction using residual coding on top of compression layer is as follows:
a) Let $O(n,i)$ represent the region "i" of the "nth" original image frame;
b) Let $W(n,i)$ represent the region "i" of the "nth" modeled image frame. This "nth" modeled image frame may be warped (extrapolated) or otherwise compressed data;
c) Let $R(n,i,k)$ represent the "kth" quantized level of the residual for region "i" calculated between the "nth" frame such that:

$$R(n,i,k)=Q([O(n,i)-W(n,i)],k)$$

where Q is some function that quantizes the residual such that k=0 implies no quantization and that as k increases, the coarseness of the residual increases. For example, $Q(x,k)= x>>k$, where the symbol >> signifies a right shift operation.

The approach according to the invention defines a new residual as follows.

Let $R(n,m,i,k)$ represent the "kth" quantized level of a new residual for the region "i" calculated for the "nth" frame corrected by the residual $R(m,i,k)$ from a previous (m<n) frame where:

$$R(n,m,i,k)=Q(O(n,i)-[W(n,i)+R(m,i,k)],k),$$

In this approach, the best residuals $R(n,i,k)$ or its index in the decoders database and $R(n,m,i,k)$ is transmitted along with compressed data to correct the "ith" region of the frame. By "best" is meant the smallest number of bits are required for the biggest improvement with the rate constraint met by adjusting k. It is to be noted that m=n−1 would be used to correct a slow moving object. For an object with repetitive or near repetitive motions, such as eye or mouth openings or closing for a talking head, a collection of various "m" may be stored in both the encoder and decoder to form a catalog that is managed by the encoder based on frequency of use and available memory at the decoder. The best of the multiple choices from the encoders catalog is transmitted to the decoder. It is to be noted that the above procedure may be iterated so that the "nth" frame is corrected by data from more than one previous frame.

This basic concept is to provide a very efficient encoding of the residual or error that results from failure to model certain regions correctly during the coding of temporal and spatial data of quasistationary digital motion images. The process is aimed at applications where the object or objects remain essentially the same during the sequence of interest and undergo only small changes such as the eye or mouth movements of a talking head in a televised conference or a speech delivered on information video.

Figure 1:
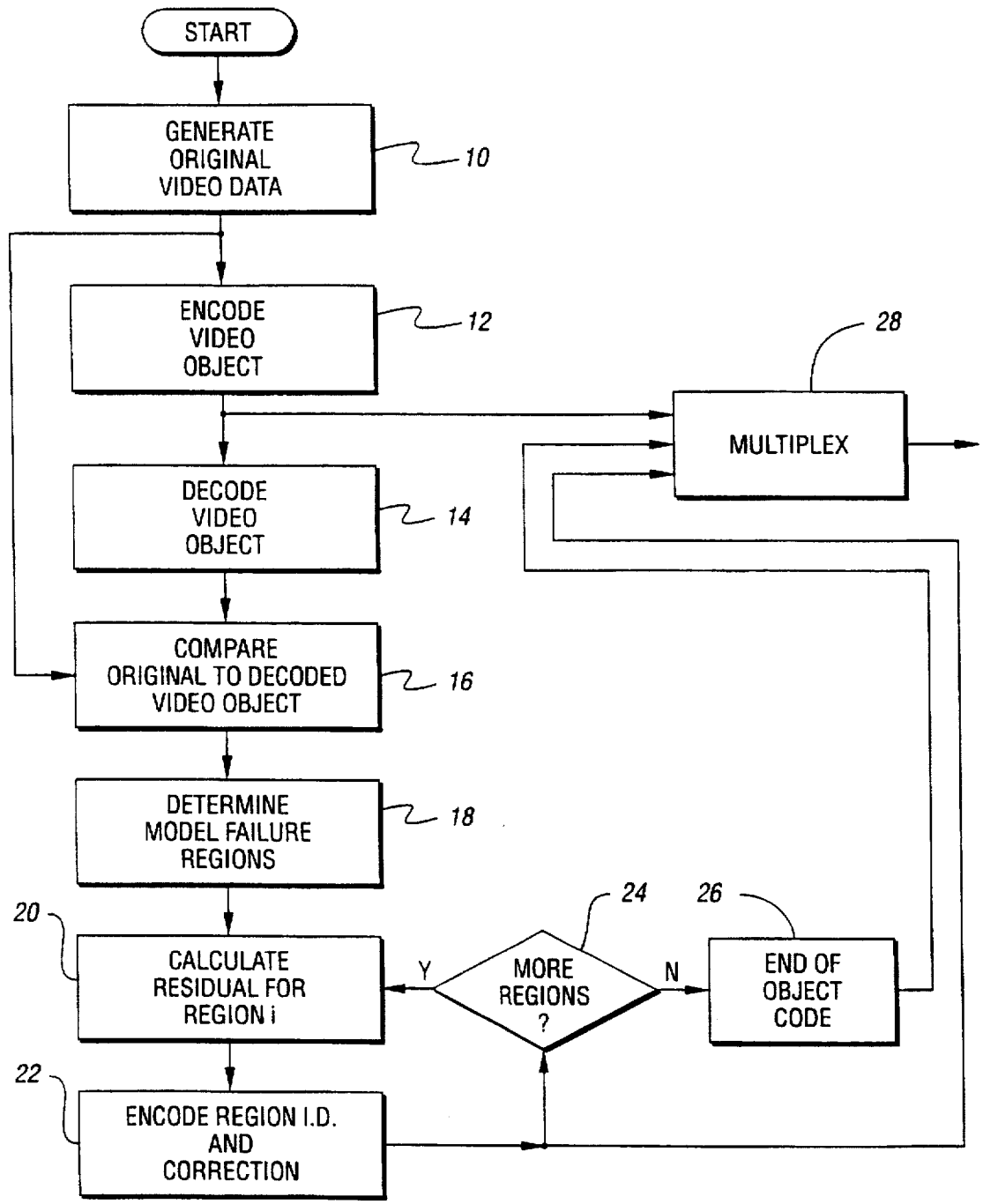
FIG. 1 is a flow diagram of a prior art encoder.
Figure 2:
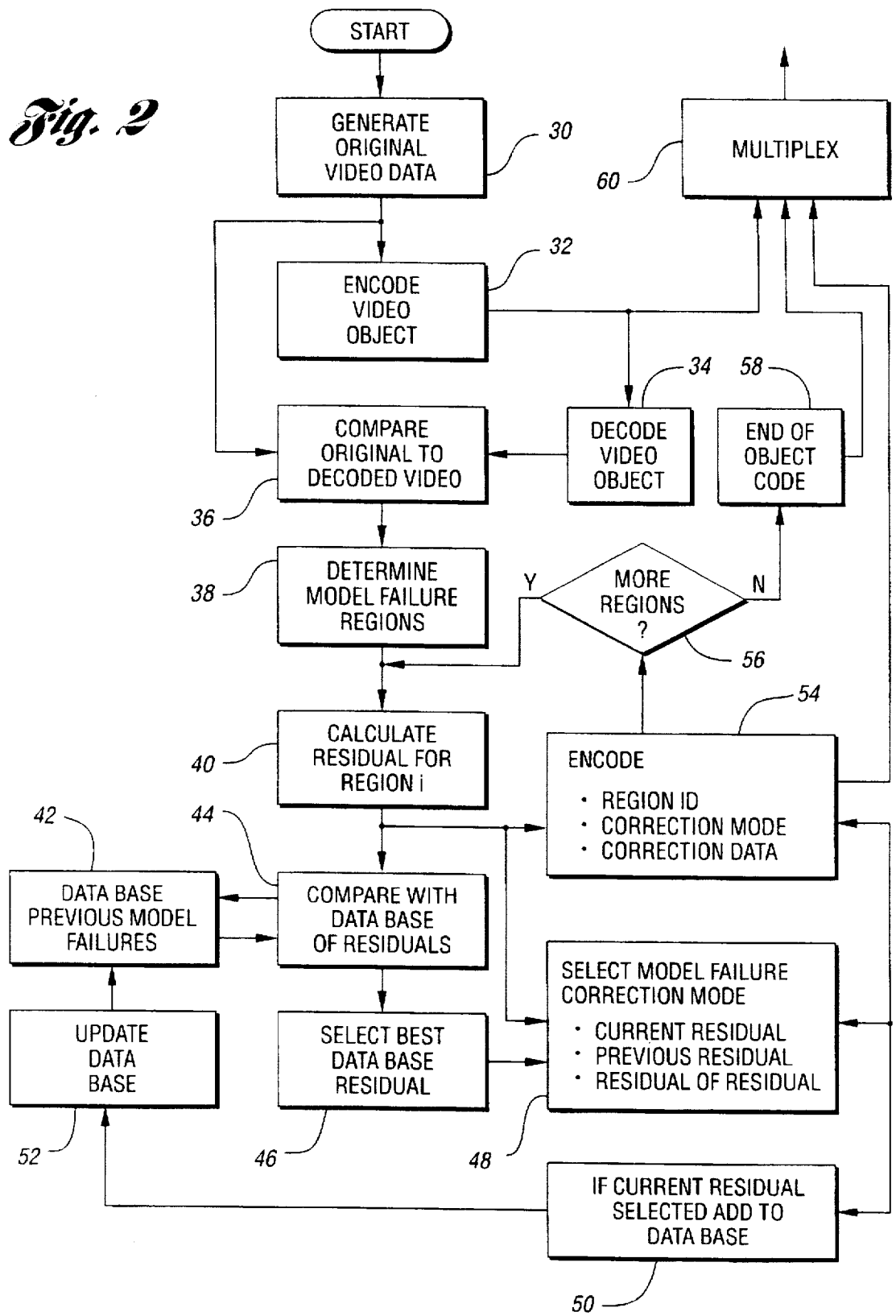
FIG. 2 is a flow diagram of an encoder according to the present invention.

FIG. 2 is a flow diagram of the process of encoding residuals according to the invention. The process begins with the generation of original video data to be encoded as illustrated by block 30. A video object of the original image is then encoded at block 32 to generate encoded data. The encoding of the video object data may use any technique known in the art. The video object again may be a complete picture or an identified part of a picture such as a head of a person or any other object of particular interest within the picture.

The encoded data is then decoded, block 34, using the inverse of the encoding technique used to encode the video object, in block 32, to generate decoded or model video data. The model video data is then compared with the original video data to generate difference data corresponding to the difference between the original video data and the model object data. The process then proceeds to identify or determine regions, called model failure regions "i", block 38, where the differences between the original video data and the modeled object data exceeds a predetermined threshold. The process then proceeds to calculate residual data for each model failure region "i". The residual data includes identification of the boundaries of the model failure region. The calculation of the residual will also identify the region i where the residual is to be stored to generate a database of previous model failures, as indicated by block 42. Each region "i" may be associated with a particular part of the object. For example, if the object is a head of a person, the region "i" may be the left eye, the right eye or the mouth or any other part of the head which is capable of movement independent of the movement of the head as a whole.

In accordance with the invention, identical copies of the database are kept at the encoder and at the decoder.

The residual data calculated in block 40, called current residual data, is compared with the previous model failures stored in the previous model failure database, block 44, and the best match between the current residual data and the residuals of the previous model failures stored in the database is selected. The comparison and selection methods, indicated by blocks 44 and 46, may be any known method currently being used to extract data from a database.

The model failure correction mode, block 48, selects the method to be used to correct the model failure. The correction modes are as follows:
a) Previous residual selected from the database;
b) Current residual; and
c) Residual of a residual.

The latter, the residual of a residual, is accomplished by sending the index of a previous model failure correction and the difference between this previous model failure correction and the current correction. The selection of the correction mode may be based on a number of various criteria such as a rate distortion measure or the remaining bit budget according to a predetermined bitstream rate control.

If the correction mode selected is either the current residual or residual of a residual which requires a residual not found in the database, i.e., the process determines a new residual is to be added to the database, block 50, then the database is updated with the new residual as indicated by block 52. The model failure correction mode selected in block 48 is encoded as indicated by block 54 to identify the correction mode that is to be used. The encoded information includes the identification of the region i, the correction mode, and the quantized correction data needed to correct the model failure so that the decoded image replicates the original image.

After encoding the residuals for region i, the process will inquire, decision block 56, if there are anymore regions to be encoded. If so, the process will loop back to block 40 and calculate the residual for a new region i where i=i+1 and encode the region ID, the correction mode and the correction data as indicated by block 54. In response to no more regions needing to be encoded, the process will generate an "end of object code", block 58. The encoded video image object from block 32, the encoded regions IDs, model failure correction modes and the correction data, and the end of the object code are multiplexed, block 60, to form a compressed data bitstream.

Since the database formed in block 42 is also replicated in the decoder, when the selected mode uses a stored previous model failure correction, the process of encoding the correction only needs to send an index to the database and does not have to encode the entire correction. This process is also used where the selected mode is a residual of a residual, where it is only required to index to the database for the previous correction and the difference between the previous correction and the current correction.

Figure 3:
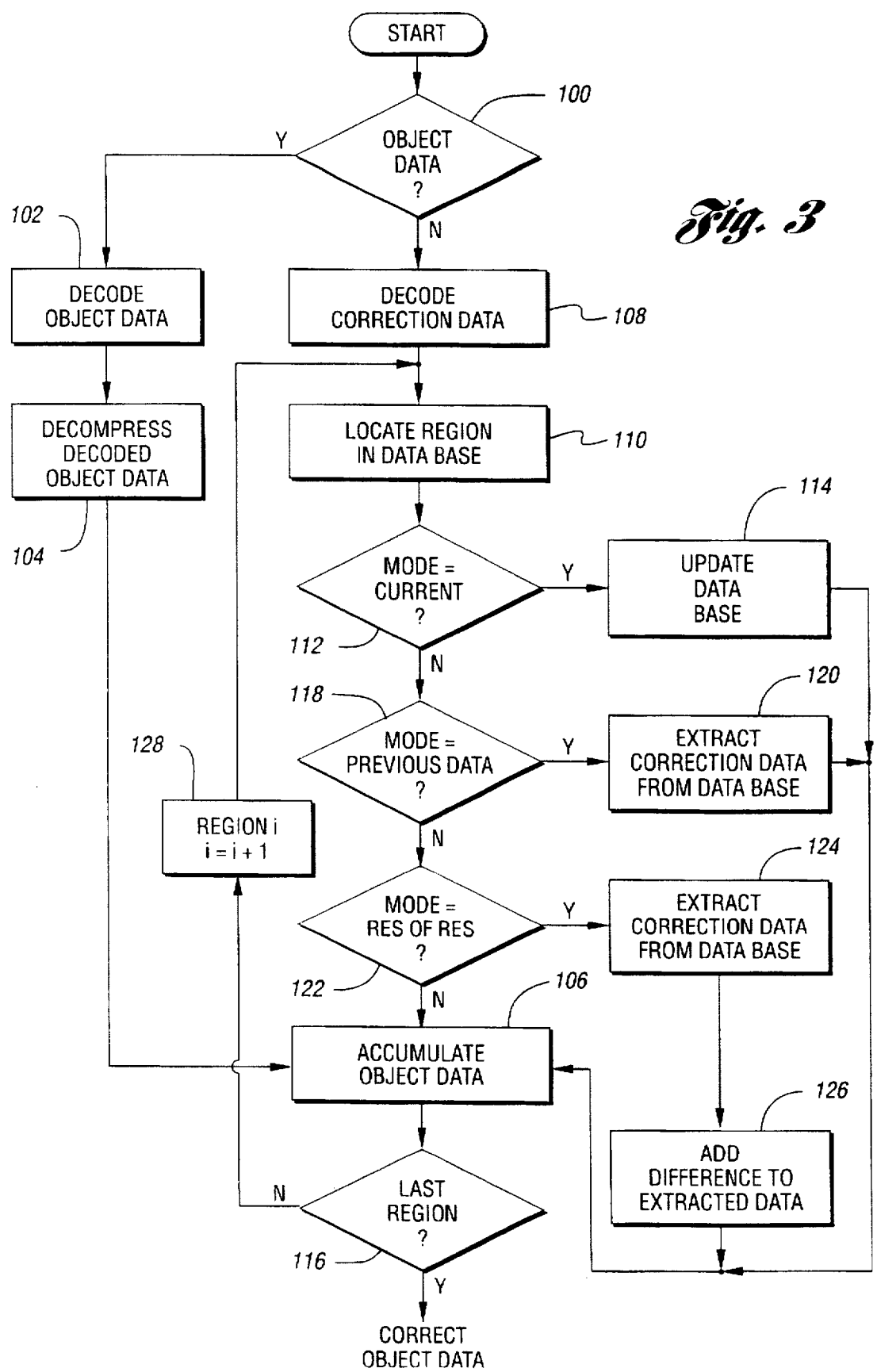
FIG. 3 is a flow diagram of a decoder according to the present invention.

The decoder, as shown in FIG. 3, uses the inverse operations to recover the original video object. The encoded bitstream is demultiplexed, decision block 100, to separate the encoded original video object data from the encoded correction data for each model failure. The encoded original video object data is decoded, block 102, then decompressed, block 104, and processed by a microprocessor to be corrected with the decoded model failure correction data, as indicated in block 106 entitled accumulate object data.

The correction data is decoded, block 108, and the region identified in the correction data is identified, block 110. The decoding process then inquires, decision block 112, if the mode identified in the correction data is the current mode. If it is, the database is updated with the correction, block 114, the correction is added to the current video object data, block 106, then the decoder inquires, decision block 116, if the end of object code has been received indicating the last region in the object has been decoded and the object is complete. If the mode is not the current mode, the decoding process inquires, block 118, if the mode is the previous data mode indicating the correction data exists in the database. The process will then extract the correction data from the database add it to the current video object data, block 106, and again inquires, block 116, if the correction for the last region has been obtained. If the mode is not the current mode or previous data mode, the process will inquire, block 122, if the mode is the residual of residual mode. If it is, the process will extract the correction data from the database, block 124, using the included index and add to this correction data the difference data appended to this mode. The process will again add the correction data to the current video data, block 106, and inquire if the end of the object code decision block 116 has been received. It is to be noted that the database in block 120 is the same as in block 124.

If an end of object code has not been received, the process will index to the next region i=i+1 of the object block 128 and the process is repeated for each region i of the object. Upon the receipt of the end of object code, decision block 116, the process will output the accumulated video object data, block 106, which has minimized the failures of the model data in each of the identified regions of the object and more accurately replicate the original image.

While the best mode for carrying out the invention has been described in detail, those familiar with the art to which this invention relates will recognize various alternative designs and embodiments for practicing the invention as defined by the following claims.

What is claimed is:

1. A method for residual coding the model failure regions in compressed video sequences comprising:

storing a database of previous model failures;

encoding original video data to generate encoded video data;

decoding said encoded video data to generate model video data;

comparing said model video data with said original video data to generate at least one model failure region when the difference between the original video data and the model video data exceeds a predetermined value;

calculating residuals for each of said at least one model failure region to generate a current residual for said at least one region;

comparing said current residual with residuals stored in said database of previous model failures relative to said at least one model failure region;

selecting from said database the best of said residuals of said previous model failures;

selecting a model failure correction mode from at least the residual stored database of previous model failures or said current residual;

encoding said selected model failure correction mode to generate encoded model failure correction data;

repeating the steps from said step of calculating residuals to said step of encoding said selected model failure mode until each model failure region has been encoded; and multiplexing said encoded video data and said encoded selected model failure mode to form a bit string of encoded data.

2. The method of claim 1 further including updating said database of previous model failures with said current residual in response to said current residual being selected as the model failure correction mode.

3. The method of claim 2 wherein said step of selecting a model failure mode includes the selecting of a residual of a residual model failure correction mode which is the combination of the selection of the best previous residual from said database and the difference between the best previous residual and the current residual.

4. The method of claim 3 wherein said step of encoding includes the steps of encoding an identification of the region, encoding the correction mode encoding and the associated correction data.

5. The method of claim 1 wherein said step of encoding original video data encodes a complete picture.

6. The method of claim 1 wherein said step of encoding original data encodes a portion of a complete picture.

7. The method of claim 6 wherein said portion of a complete picture is a human head.

8. The method of claim 1 further including the step of decoding said bit string of encoded data.

9. The method of claim 8 wherein said step of decoding said bit string of encoded video data includes:

storing a database of previous model failures;

extracting from said database of previous model failures the residual encoded in said bit string of encoded data; and combining said residuals with said original coded data to replicate said original video data.

10. The method of claim 9 further including the step of updating said database of previous model failures with said current residual in response to a current model failure correction mode being identified in said bit string of encoded video data.

* * * * *